United States Patent [19]

Vulis et al.

[11] 4,184,042

[45] Jan. 15, 1980

[54] MULTISECTION SUPERCONDUCTING CABLE FOR CARRYING ALTERNATING CURRENT

[75] Inventors: Mikhail L. Vulis; Igor V. Rybin; Pavel B. Shenderovich; Valery A. Golenchenko; Igor S. Shevchenko; Vladimir G. Schedrin, all of Moscow, U.S.S.R.

[73] Assignee: Gosudarstvenny Nauchno-Issledovatelsky Energetichesky Institut Imeni G.M. Krzhizhanovskogo, Moscow, U.S.S.R.

[21] Appl. No.: 865,311

[22] Filed: Dec. 28, 1977

[51] Int. Cl.² .......................................... H01B 12/00
[52] U.S. Cl. ............................... 174/15 S; 174/128 S
[58] Field of Search ............... 174/15 R, 15 S, 15 CA, 174/128 S, 126 S, 120 SC, 34

[56] References Cited

U.S. PATENT DOCUMENTS

| | | | |
|---|---|---|---|
| 3,292,016 | 12/1966 | Kafka | 174/15 S X |
| 3,390,703 | 7/1968 | Matlow | 174/15 S |
| 3,612,742 | 10/1971 | Snowden | 174/15 S |
| 3,643,002 | 2/1972 | Minnich | 174/15 S |
| 3,675,042 | 7/1972 | Merriam | 174/15 S |
| 3,749,811 | 7/1973 | Bogner et al. | 174/15 S |
| 3,780,206 | 12/1973 | Reynolds | 174/120 S X |
| 3,947,622 | 3/1976 | Graneau | 174/15 S |
| 4,039,740 | 8/1977 | Iwata | 174/15 S |

FOREIGN PATENT DOCUMENTS

| | | | |
|---|---|---|---|
| 1505605 | 11/1967 | France | 174/15 S |
| 1541728 | 9/1968 | France | 174/15 S |
| 53-4716518 | 11/1978 | Japan | 174/15 S |

*Primary Examiner*—Arthur T. Grimley
*Attorney, Agent, or Firm*—Burgess, Ryan and Wayne

[57] ABSTRACT

A multisection superconducting cable for carrying alternating current and comprising a heat insulation envelope, a superconductive shield with a stabilizing substrate and an electrical portion for carrying an electrical current and including at least one conductor assembly of two coaxial cores, one of which cores is made tubular and provided with a superconductive layer and a stabilizing substrate, another core running inside said tubular core. The stabilizing substrates of each section of the electrical portion and of the shield are formed by local segments of a stabilizing material which segments are separated by a material of a lower electrical conductivity than the stabilizing material, the resistance of the stabilizing substrates within each section being in excess of the impedance of the electrical portion of this section. Both the cores of the electrical portion are electrically connected at least in the points intended to be used for connection of terminal devices, the inner core being made of a normal metal and the thickness of the stabilizing material of the substrate being not in excess of the effective depth of penetration of alternating current.

The proposed cable can find its practical utilization in superconducting transmission systems.

10 Claims, 9 Drawing Figures

MULTISECTION SUPERCONDUCTING CABLE FOR CARRYING ALTERNATING CURRENT

The present invention relates to electrical power transmission cables and, more particularly, to multisection superconducting cables for carrying alternating current and can find its practical utilization, for example, in superconductive power transmission lines.

In modern practice, power transmission systems are characterized by fault currents equal to many times the full load current, their duration largely depending on configuration of the system and its protection, and sometimes amounting to several seconds.

Solutions thus far proposed to ensure serviceability of a superconducting cable after a fault current ceases in a power transmission system may be broadly divided into two groups.

The first group of the solutions presupposes that the cable remains superconductive over the entire period of action of overload current during which period the cable is either disconnected from the system or is used for carrying the current; according to the other group of solutions, superconductive properties are restored to the undisconnected cable as soon as the overload conditions ceases.

Most embodiments related to the first group of solutions contain such basic elements as a current limiting means and a circuit breaker, the current limiting means being either a controlled superconducting insert, or a reactor, or a cavity.

The aforementioned circuit breakers may be made conventional or superconducting with the fault current switching taking place in the hot state in both cases.

The major disadvantages of the embodiments employing controlled superconducting inserts are as follows:

(a) a considerable expenditure of superconductive material, a requirement dictated by the need to build up a substantial resistance insuring the current limiting effect under a fault current condition;

(b) the absence of a stabilizing element which would reduce the current limiting effect and, hence, the need to employ such high thermal capacity superconductors as lead;

(c) the need to develop a special control equipment and a refrigeration system;

(d) low reliability and high costs together with considerable time required for the insert to regain its superconductivity for repeated switching of the cable into the power transmission line.

The embodiments based on use of reactors or cavities are distinguished for large dimensions of the apparatus and their high costs for manufacture.

Also known in the art are embodiments based on fast disconnection of the cable without making recourse to current limiting means but employing various grounding devices, switches and fuses instead.

However, high speed of action of the above devices does not supply a satisfactory solution and, besides, all the aforementioned embodiments involve a breaking of the circuit thus liberating the electromagnetic energy stored in the cable to dissipate which energy it is necessary to undertake special measures, as well as require that a means for repeated connection of the cable to the circuit be provided.

There is known an embodiment wherein the cable, while remaining connected to the power transmission line, retains its superconductivity by using two superconductive layers one of which layers is used to carry the normal rated current and the other to carry the overload current.

However, employment of a refrigerator, substantially increasing the costs of a superconducting power transmission line, combined with the problem of optimization of the process of pumping the single-phase refrigerant through the cable as well as of introduction of advantageous techniques for production of high-temperature superconductors have led to the use, as the main element carrying the normal load current, of a superconductor with high critical parameters.

For example, research conducted on niobium-tin alloys ($Nb_3Sn$) has shown that the magnitude of the magnetic field of penetration (H) is related to the thickness ($\Delta$) of the superconducting layer by $$H \div \sqrt{\Delta} \qquad (1)$$

If similar superconductors are used for the layer carrying the overload current and the basic layer, to preserve current losses in the layer carrying the overload current at the same level as in the basic layer, the thickness of this layer should be chosen equal to that of the basic layer times the squared ratio of the overload current to the normal rated current, i.e., the thickness of the stabilizing superconductive layer should be at least two orders greater than the thickness of the basic layer thus running into millimeters.

Inasmuch as the relationship between the current losses and field magnitude in the aforementioned conductors is strictly nonlinear, using a power well in excess of a unity, with the second superconductive layer, employed to carry the fault current, made at least several times thinner than required to satisfy the relation $H \div \sqrt{\Delta}$, the basic superconductive layer will not be possible to stabilize.

Therefore, the simplest and most expedient way to solve the overload current problem will be to put up with the loss of superconductivity by the cable under an overload current condition with subsequent restoration of the superconductive properties after the overload current ceases.

It has been known that a stabilizing substrate of a superconductive current carrying system can be employed to carry fault current.

However, in this case, superconductivity will only be regained if a specific combination of heat evolution in the stabilizing substrate, amount and thermal capacity of the refrigerant, and heat exchange is available, which is acieved primarily be selecting a suitable cable size.

Also, making the most of the current carrying properties of a superconductive material substantially cuts down the costs of both the current carrying system and its cryogenic sheath as well as reduces external heat supply. In such a situation, optimization of a superconducting power transmission line largely depends on the techniques of production of hard-type superconductors and on the costs of the refrigerating equipment.

The advancement of superconductor production techniques and refinements made in refrigerator construction are matched by a parallel reduction in cable size thus bringing it to the minimum determined by the current carrying capacity of the superconductor.

Up to the present, however, efforts towards optimizing superconducting power transmission lines have resulted in most cases in cable sizes approximating the minimum ones, which is inconsistent with the conditions which ensure restoration of superconductivity after the fault current ceases. Indeed, the function of a substrate fabricated from a normal metal is to stabilize the superconductor, i.e., to obviate the disturbances resulting from drastic fluctuations of the magnetic flux, mechanical alternating forces, heterogeneity of the superconductor, which manifests itself through transition of local sections of the superconductor to the normal conducting state.

At the same time, the stabilizing substrate acts as a shunting and heat removing member, which means that for all practical purposes almost any section of the superconductor surface should be in good thermal and electrical contact with it.

However, transport of electrical current in the substrate under a fault current condition, due to said good contact of said substrate with the superconductor surface, results in considerable heating of the superconductive current carrying system, and it is practically impossible to reduce this heating to the level at which the superconductor still retains its superconductive properties, since the alternating current losses even in a very high purity metal by far exceed the hysteresis losses in superconductors.

As noted above, recovery of superconductive state can be ensured only when a specific combination of heat evolution in the stabilizing substrate and amount of the refrigerant is available, which combination requires a cable size several times in excess of the size of the cable designed to carry a normal rated current.

An example most closely resembling, by the spirit and inventive features, the claimed cable is found in a superconductive cable (cf. U.S. Pat. No. 3,600,498, cl. 174-15, 1971) comprising a thermal insulation envelope, a superconductive shield with a stabilizing substrate and an electrical portion for carrying an electrical current and including at least one conductor assembly of two coaxial cores, one of which is made tubular and provided with a superconductive layer and a stabilizing substrate, another core running inside said tubular core.

In said superconductive cable, the internal core also contains a superconducting layer and is used to carry direct current as the external core does, whereas alternating current is carried solely by the external tubular core. In alternating current power transmission, the internal core may be considered as an additional stabilizing member which together with the external core can be used for carrying an overload current.

After a certain value of overload current is reached which is way below the fault current level, the operation of such a cable and its state will be equivalent to those of a cable wherein the stabilizing substrate is intended to carry the fault current. While being advantageously used for carrying both direct and alternating currents, such a cable has all the aforementioned drawbacks typical of the cable with two superconductive layers and the cable with a superconductor whose stabilizing substrate is used to carry the fault current.

It is an object of the present invention to provide a cable of a smaller size, a cable which may lose its superconductivity under a fault current condition and which insures uninterrupted transmission of power to the users.

A further object of the invention is to simplify the cable production techniques.

Still further object of the invention is to improve cable stabilization under the rated current conditions.

Yet another object of the invention is to reduce the amount of metal used up in cable production and to enhance the stabilizing effect of the conductor core made of a normal metal.

Still another object of the invention is to improve effectiveness of thermal insulation envelope.

One more object of the invention is to enhance reliability of cable operation under overload current conditions.

To attain this objective, it is proposed, according to the invention, in a multisection superconductive cable designed for carrying alternating current and comprising a thermal insulation envelope, a superconductive shield with a stabilizing substrate and an electrical portion for carrying an electrical current and including at least one conductor assembly of two coaxial cores, one of said cores being made tubular and provided with a superconductive layer and a stabilizing substrate, another core running inside the first one, to use in each section or a length of the electrical portion a stabilizing substrate formed by local segments or spots of a stabilizing material, which segments are separated by a material of lower electrical conductivity than the stabilizing material, the resistance of the stabilizing substrate within each length of of the electrical portion exceeds the impedance of the electrical portion; both cores of the conductor assembly of the electrical portion are electrically connected at least in the junction points intended to be used for connection of terminals, the inner core being made of a normal metal and the thickness of the stabilizing material being not in excess of the arms (effective) depth of penetration of alternating current.

It is also proposed to make the stabilizing substrate of the shield similarly to the stabilizing substrate of the conductor assembly.

As a variant, a dielectric can be used as a material separating the segments of the stabilizing material.

Where the cable shield is used as a return wire it is expedient to supply the shield with a normal metal core that will surround the shield and will be separated from it with a layer of thermal insulation, the shield and the wire being electrically connected at least in the points intended to connect the terminals. To simplify the cable production techniques, a metal or alloy may be used as a separating material for the stabilizing material of the substrate.

For better stabilization of the cable operation under the rated current conditions, it is proposed to reinforce the segments of the stabilizing material with a superconducting material.

Where a metal or an alloy is used as a separating material, the exterior surface of the separating material of the shield and the interior surface of the separating material of the conductor may be covered with a layer of a superconductive material similar to that of the basic superconductive layer.

It is also practicable to reduce the amount of metal utilized in the cable and to enhance the stabilizing action of the normal metal core of the conductor operating under the rated conditions by separating the normal metal core from the superconductive core of the conductor with a thermal insulation layer.

Besides, it is preferable in order to obtain a better thermal insulation to use superconductive jumpers for electrical connection of the respective normal metal core to the superconductive core on the one hand, and the normal metal core to the return wire, on the other.

It is also expedient for more reliable operation of the cable under the overload current conditions to place, at least in the points intended for connection of the terminals, superconductive inserts made of the II type superconductor and satisfying the condition.

$$H_2/H_1 \leq I_2/I_1, \qquad (2)$$

where:

$H_1$ and $H_2$ are the first and second critical fields of the superconductive material of the insert, respectively;

$I_1$ and $I_2$ are the rated and overload currents of the cable, respectively.

The exact nature of the invention will be readily apparent from the following specification of the superconductive cable with due reference to the accompanying drawings in which.

Figure 5:
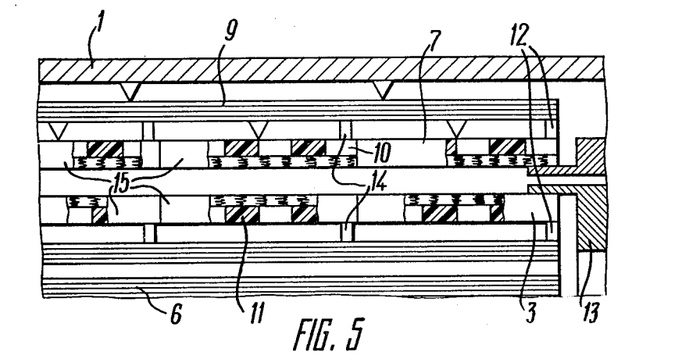
FIG. 5 is showing electrical connection of the superconductive and normal metal cores for both the forward and return wires of a single-phase cable.

The cable according to the invention comprises a thermal insulation envelope 1 (see FIGS. 1–2) and electrical portion 2 including a core 3 made tubular and provided with a superconducting layer 4 which is stabilized with a substrate 5, and a normal metal core 6 running inside the core 3, as well as a superconductive shield 7. Each shield 7 (or a return wire used as the shield 7, (referred to as return wire 7 hereinafter) is supplied with a substrate 8 similar to the substrate 5 of the electrical portion 2 while the return wire 7 is surrounded with a core 9 made from a normal metal. The stabilizing substrates 5 and 8 are formed by locally situated segments 10 (see FIGS. 3–4) of a stabilizing material, which segments are separated from one another by a material 11 of a lower electrical conductivity. The core 6 is electrically connected to core 3 and the core 9 is connected to the return wire 7 at junction points 12 (see FIG. 5) designed for connection of the cable to the terminal devices 13, and, when required they also may be connected at junction points 14 used for connection of two adjoining lengths 15 of the cable. Cooling of the cable is effected by helium, furnished into a space 16 (see FIGS. 1 and 2), which, in the single-phase cables with tubular conductors, is used as the main electrical insulating member. With three-phase cables incorporating ribbon-type conductors, electrical insulation is effected by means of a hard ribbon-type dielectric 17 (see FIG. 6).

Positioning of the forward and return wires in a single-phase cable is effected with the use of dielectric spacers 18 (FIGS. 1 and 2) supplied with electrodes 19.

Figure 1:
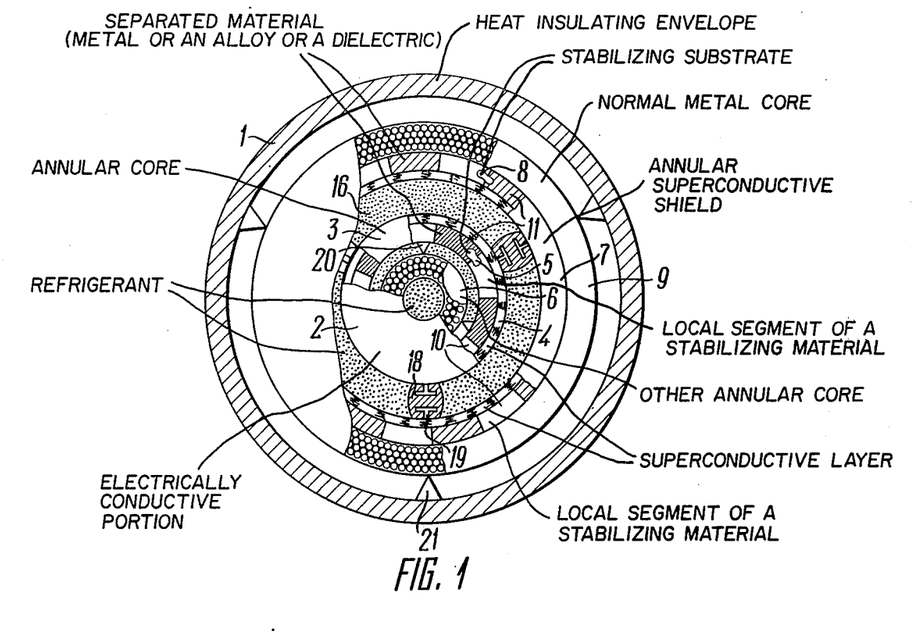
FIG. 1 is a transverse sectional elevation of the single-phase superconductive cable with tubular coaxial conductors.
Figure 2:
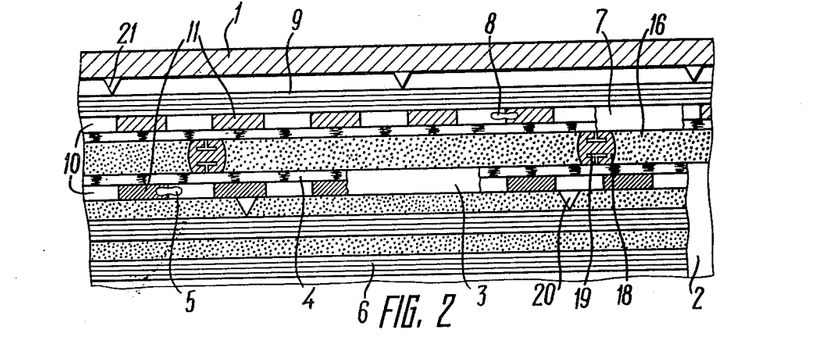
FIG. 2 is a longitudinal sectional view of the cable shown in FIG. 1.
Figures 3, 4:
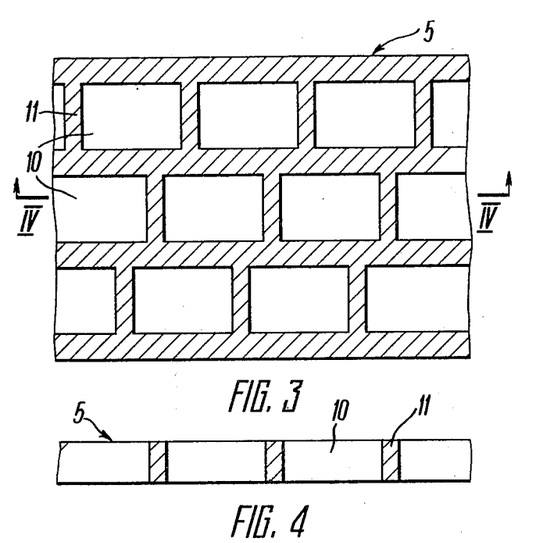
FIG. 3 is showing construction of the stabilizing substrate of the superconductive core.
FIG. 4 is a section through line IV—IV of FIG. 3.

Positioning of the core 6 is accomplished with the use of supports 20, while positioning of the entire cable electrical portion used for carrying electrical current, with the use of supports 21.

A three-phase cable comprises an electrical portion 2 and electrical portion 22 and 23 (FIG. 6), the two last-mentioned electrical portions being made similar to the electrical portion 2 whose sectional view has been shown.

Figure 6:
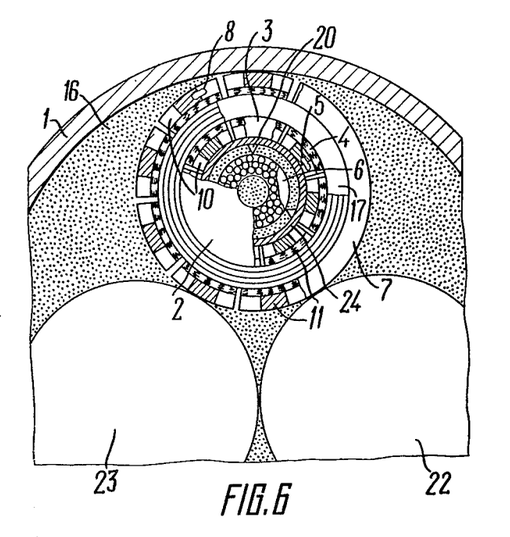
FIG. 6 is a transverse sectional elevation of a three-phase superconductive cable with ribbon-type conductors.

FIG. 6 shows a support 24 of the superconductive core 3 of the cable with ribbon-type conductors.

Advantages of the proposed construction of the cable will be elucidated with reference to a single-phase coaxial cable including the electrical portion 2 and tubular shield which is used in this case as a return wire (FIGS. 1 and 2).

An analytical expression of redistribution of current between the superconductive core and the normal metal core for a single-phase coaxial cable may be written as $$\left| \frac{I_3}{I_4} \right| = \frac{\sqrt{[R_1(R_1 + R_2) + (\omega \Delta L)^2]^2 + (\omega \Delta L R_2)^2}}{(R_1 + R_2)^2 + (\omega \Delta L)^2} \qquad (3)$$

where:

$I_4$ = total current at cable input;
$I_3$ = current in superconductive core;
$R_1$ = effective resistance of normal metal core;
$R_2$ = rms (equivalent) resistance of a superconductive core taking into account the substrate resistance;
$\omega \Delta L$ = difference between impedances of superconductive core and normal metal core.

Superconductive cables which use high purity metals satisfy the following condition:

$$\omega \Delta L > R_1 \qquad (4)$$

When input current $I_4$ does not exceed the critical one, $$|I_3/I_4| = 1$$

However, as the input current grows in excess of the critical one, a sharp increase in the superconductor resistance is registered due to movement of the magnetic lines of force. Since the superconductive core is situated in a cryogen with a finite value of heat transfer coefficient, the superconductor starts heating up thus bringing about an avalanche-like process of destruction of superconductivity, i.e., a growth of resistance $R_2$ up to the value corresponding to that of a superconductor that has changed to a normal nonsuperconducting state and is shunted by the substate.

As $R_2$ increases, a current redistribution takes place between the superconductive core and the normal metal core.

Thus, for example, at $R_2 = \omega \Delta L$ $$|I_3/I_4| = 0.5$$

For a cable with a substrate of conventional design but supplied with a normal metal core, the resistance of the superconductive core will be controlled by the resistance of the substrate, which, even if it equals the impedance $\omega\Delta L$, which is inconsistent with the requirements for stabilization of a superconductor under normal rated conditions, will result in a similar redistribution of current:

$$|I_3/I_4| = 0.5$$

In the proposed construction, the values of $R_2$ exceed $\omega\Delta L$ due to a substantial increase in resistance offered by the substrate to a transport current, which results in a current redistribution that may be written $$|I_3/I_4| = \omega\Delta L/R_2 \quad (5)$$

Consequently, a greater portion of the current will be flowing in the normal metal core constructed, for example, of transponential conductors wherein heat evolution is governed no more by the perimeter of the superconducting core but by the section surrounded thereby. In situations like this, a decrease in heat evolution in such a core is related to heat evolution in the substrate of the cable of conventional design by $$W_1/W_2 = K(D/\delta), \quad (6)$$

where
$W_1$ = heat evolution in substrate of conventional cable;
$W_2$ = heat evolution in normal metal core of proposed cable;
$K$ = coefficient of filling of conductor section with normal metal core;
$D$ = diameter of conductor;
$\delta$ = skin-layer of substrate stabilizing material.

Elimination of pronounced influence of eddy current losses in a normal metal core upon the total heat evolution in said core can be easily accomplished by selecting suitable diameters for individual strands of the core.

The requirements for resistance of the superconductive core may be related to the following considerations.

Heat evolution in the substrate of a conventional cable equals $$W = I^2 R, \quad (7)$$

where
$I$ = overload current (input current of cable);
$R$ = resistance of substrate.

The substrate resistance will be given by $$R = \rho(l/\pi \cdot D\delta), \quad (8)$$

where:
$\rho$ = specific electrical resistance of stabilizing material of substrate;
$l$ = cable length.

On the other hand, heat evolution in a superconducting core (with the same cable length) with be given by $$W = I^2(\omega\Delta L)^2/R_2 \quad (9)$$

So, resistance of a superconductive core will be in excess of $$(\omega\Delta L)^2/R \quad (10)$$

If the above condition (10) is satisfied, the total heat evolution in a normal metal core and a superconductive core proves to be far less than the losses in the substrate of a conventional cable of the same diameter.

However, if practically all of the fault current is passed through the normal metal core, the substrate of the superconducting core becomes situated within an alternating magnetic field with the result that eddy currents are induced in the substrate stabilizing material. Selecting the thickness of the substrate stabilizing material less than its skin layer thickness results in reduction of the eddy current losses with respect to the heat evolution in the substrate of a conventional cable by an amount given by $$N = 0.5 \, (\delta/\Delta)^3, \quad (11)$$

where $N$—is a number which indicates the number of times the eddy current losses are less than the losses that result from passage of a transport current in the substrate of a conventional cable.

A substantial decrease in thickness of the stabilizing material layer of the substrate is limited by the requirements to stabilize the superconductive core under the rated current conditions.

Hence, the maximum decrease in heat evolution and, therefore, in size of the cable can be provided in a cable which employs superconductors whose resistance is greater in the normal conditions and whose stabilizing substrate offers maximum resistance to a transport current, the thickness of the substrate stabilizing material layer being less than its skin-layer thickness.

As is apparent from the above estimates, in the proposed cable the biggest contribution to the total heat evolution is made by the eddy current losses in the substrate.

Shunting the cable sections by a normal metal core makes it possible to protect the superconductor of the cable from burnouts in the event that the normal zone continues to spread along the superconductor despite the stabilizing action of its substrate under the rated conditions. Such an arrangement enhances reliability of the cable under the normal rated conditions.

Figure 7:
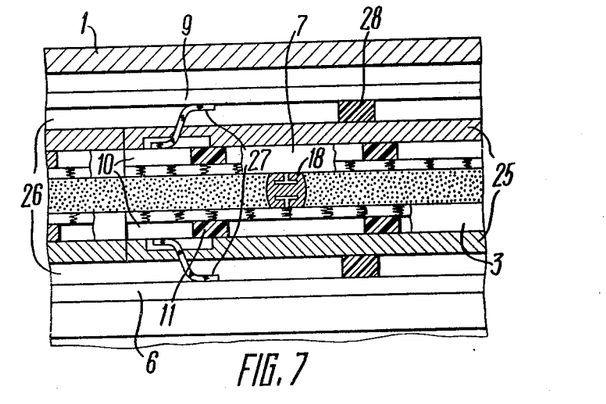
FIG. 7 is a variant of the single-phase cable with thermal insulation.

FIG. 7 shows an embodiment which is characterized in that in a single-phase cable with tubular coaxial conductors there is provided an effective thermal insulation of, for example, vacuum type, which insulation separates the normal metal core 6 from the superconductive core 3 and also separates the return wire 7 from the normal core 9 surrounding said return wire.

The superconductive core 3 and the return wire 7 are each supplied with a vacuum-tight sheath 25 made, for example, of steel and are separated from the respective cores 6 and 9 of normal metal, made as tubular conductors, by means of a thermal insulation medium 26, said medium being vacuum in this case. Electrical connection of the cores 3 and 6 to each other and of the return wire 7 to the core 9 is accomplished with the aid of jumpers 27 made of a superconductive material. Proper spacing of the cores 6 and 9 is achieved through supports 28 of low heat conductivity.

In the illustrated embodiment, the normal metal core acts as a heat accumulator for the period of a short circuit, and absorption of heat by the refrigerant can be made commensurate with the rate of flow of the refrigerant.

Introduction of thermal insulation into construction of the cable makes it possible to simplify the construction of the normal metal core, to make it, for example, tubular to reduce metal content in the core, to select a cheaper though less pure material for the conductor, to enhance the stabilizing effect of the core upon the superconductor under the rated conditions. For electrical connection of the superconductive core 3 and the normal metal core 6 (similarly, the return wire 7 and its core 9) there can be employed superconductive jumpers acting as heat dissipating elements. Besides, incorporation of a thermal insulation member makes cooling of the normal metal core 6 optional, said cooling being so arranged that it may differ from the cooling of the superconductive core 3 of the cable in that it can be advantageously accomplished, for example, through the medium of such a refrigerant as frozen out hydrogen.

As stated above, the eddy current losses in the stabilizing material of the substrate are largely responsible for heat evolution occurring under a fault current condition, the magnitude of said losses being governed by the thickness of the substrate and specific resistance of the stabilizing material thereof.

However, the thickness of the stabilizing layer can be reduced and conductivity of the stabilizing material worsened only within the scope determined by the requirements for stabilization of the superconductive cable under the rated conditions of its operation.

On the other hand, employment of such superconductors as, say, niobium-tin ($Nb_3Sn$) whose production techniques dictate the presence of a niobium underlayer used to shunt the superconductor and the substrate places less stringent requirements for the electrical conductivity of the separating material of the substrate thus making it possible to use as a separating material not necessarily a dielectric but, for example, niobium or its alloy, as is the case under discussion.

Figure 8:
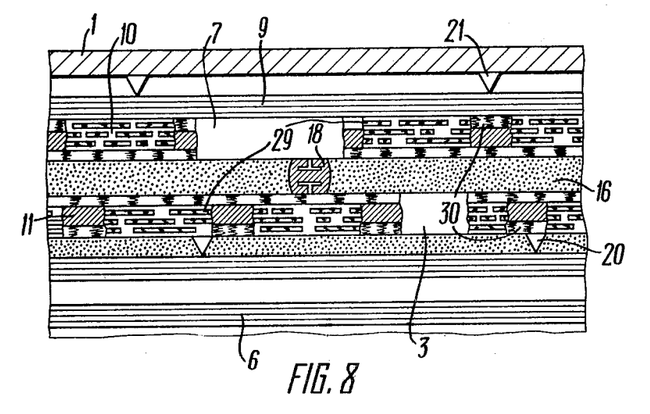
FIG. 8 is a variant of construction of a single-phase cable wherein the stabilizing material of the substrate is reinforced with a superconductive material.

Accordingly, an embodiment will now be described with reference to FIG. 8, showing a single-phase coaxial cable with tubular conductors, the techniques of production of which cable being simplified and stabilizing properties of the substrate considerably improved.

In the cable according to the invention, the local segments 10 of the stabilizing material of the substrates 5 and 8 are reinforced with the superconductor 29, while the exterior surface of the separating material layer 11 of the substrate 8 of the shield 7 and the interior surface of the separating material layer 11 of the substrate 5 of the superconductive core 3 are covered with a layer 30 of a superconductive material like $Nb_3Sn$ (niobium-tin), the basic layers 11 of the separating material being made, for example, of niobium alloyed with zirconium.

The superconductive materials used in the substrates 5 and 8 do not exceed in their current carrying capacity the basic superconductive layer and do not create single superconducting paths for transport of electrical current, but only cause certain localized growth of conductivity thus reducing the heat evolution during stabilization of the basic superconductor and making it possible to either reduce the thickness of the substrate or to worsen the purity of the normal metal, which results in decreasing the eddy current losses.

Such an embodiment paves way to utilization of production wastes of certain industries engaged in production of superconducting busbars for various magnetic systems and electrical machines and, besides, is based on the existing techniques of application of superconductive layers.

The most up-to-date techniques used for producing blanks for current carrying cores, for example, of coaxial tubular conductors is based on the metallurgical method which can be considerably simplified if such materials as niobium with various additives or its alloys are used for substrate manufacture.

As noted above, very attractive is the embodiment which allows to preserve superconductivity under a fault current condition.

As is apparent from the preceding discussion, redistribution of current between the superconductive core 3 and the normal metal core 6 is the better, the greater the resistance of the superconductive core, which resistance reaches its maximum when the cable becomes non-superconducting. The loss of superconductivity in this case is brought about by a thermal shut off of the superconductor, whereas a similar effect can be derived from the action of a magnetic field upon the superconductor.

However, the superconductors utilized in the cable possess high critical parameters so that the shut off fields by far exceed the fault current fields.

All this allows to carry out the invention into an embodiment assuring a selective shut off of the inserts placed between individual sections of the cable, said inserts being made of a II-type superconductive material which satisfies the condition $$(H_2/H_1) \leq (I_2/I_1), \tag{12}$$

where
$H_1$ and $H_2$ are the first and second critical fields of superconductive material of insert, respectively;
$I_1$ and $I_2$ are the rated and overload currents of cable, respectively.

Said inserts may be situated at each junction of the individual cable lengths or form localized sections or one common section disposed anywhere along the cable. The total length of the inserts should build up a resistance assuring such a redistribution of current which, if taken with due regard for other heat evolutions in the superconductive core viz. eddy current losses, will preserve the superconductive properties of the core with the result that this core will carry the residual current without losses.

The insert will be shut off with a fault current and will accumulate all the major heat evolutions, while cooling of these known areas will be organized in a simpler way and may differ from the way the entire cable is cooled. For example, the cooling of an insert may be exercised separately from the cooling of the entire cable, and these different cooling arrangements within the cable may be separated by means of thermal insulation. Under overload current conditions, and particularly, after the overload conditions cease, the insert may be forced cooled.

Unlike the prior art controlled superconducting inserts which exercise a current limiting effect, the proposed insert is required only for the purpose of current redistribution, which, in the first place, calls for a much lower ohmic resistance in the insert when the latter loses its superconductivity than would be necessary for limitation of the current at some particular location of the superconductive cable within a power transmission system, i.e., saves the expenses of a superconducting material, while, in the second place, the proposed insert does not require controlling arrangements thus enhancing the reliability of the cable operation.

Figure 9:
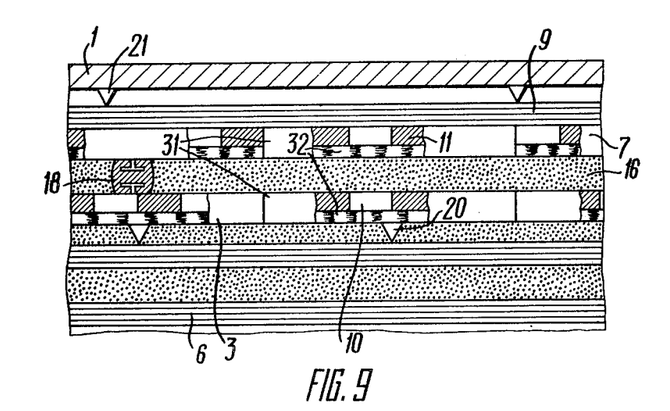
FIG. 9 is a longitudinal sectional view of a single-phase cable with inserts placed between individual lengths thereof.

Referring now specifically to FIG. 9, the proposed cable is supplied with inserts 31 that use a superconductor 32 which satisfies the condition mentioned above.

The construction of the substrate of the superconductor of the insert 31 is similar to that of the substrates 5 and 8.

It should be emphasized that the superconductor of the insert may be stabilized by another method, e.g., the enthalpy method, which will allow making the substrate of a heat-absorbing material possessing high electrical resistance.

Besides, it is also possible, for example, to make the entire cable of such a superconductor which will allow redistribution of corrent between the superconductive core and the normal metal core within a practically "cold" current carrying system.

It should be noted also that employment of the inserts 31 allows to increase a content of the stabilizing material in the substrate of the superconductive cores of the individual cable lengths.

The size of the insert, with possibility of other cooling arrangements taken into account, may not differ from the sizes of individual cable lengths. In the proposed embodiment, the normal metal cores are not provided with heat insulation.

The proposed modifications of the invention relating to the multisection superconducting cable for carrying alternating current make it possible to make this cable so that it practically suits the rated parameters of a power transmission system irrespective of the parameters of the fault current conditions and location of the cable within said system.

What is claimed is:

1. A multisection superconductive cable for carrying alternating current, which comprises a hollow cylindrical heat insulating envelope, an annular superconductive shield with a stabilizing substrate disposed within said envelope; an electrically conductive portion for carrying an electrical current disposed within said shield and including at least one conductor assembly of two coaxial cores, one of which cores is annular and provided with a superconductive layer and a stabilizing substrate, the other core being disposed inside said annular core; terminal devices for input and output of power transmitted over the cable; said stabilizing substrate of each section of said electrical portion being formed by local segments of a stabilizing material and separated by a material of a lower electrical conductivity than the stabilizing material, the effective resistance of said stabilizing substrate within a given length of said cable being in excess of the impedance of said electrical portion of said cable length with said cores of said electrical portion being electrically connected at least at the points intended to be used for connection of said terminal devices and said other core of the conductor assembly being made of a normal metal, the thickness of the stabilizing material of said substrate not exceeding the effective depth of penetration of alternating current.

2. A cable as claimed in claim 1, wherein said stabilizing substrate of said shield is formed by local segments of a stabilizing material, separated from one another by a material whose electrical conductivity is lower than that of the stabilizing material.

3. A cable as claimed in claim 2, wherein said shield has a normal metal core which surrounds the shield and is separated from said shield by means of a layer of thermal insulation, said shield and core being electrically connected at least at the points intended to be used for connection of said terminal devices.

4. A cable as claimed in claim 3, wherein the local segments of a stabilizing material are reinforced with a superconductive material.

5. A cable as claimed in claim 4, wherein said core of normal metal and the superconductive core of the conductor assembly are separated by a layer of thermal insulation.

6. A cable as claimed in claim 5, wherein said core of normal metal and said superconductive core of the conductor assembly, as well as said core of normal metal and shield are interconnected by superconductive jumpers.

7. A cable as claimed in claim 6, further comprising superconductive inserts made of the II-type superconductive material placed at least in the points intended to be used for connection of said terminal devices, the superconductive material of the inserts satisfying the condition $$(H_2/H_1) \leq (I_2/I_1),$$

where:
$H_1$ and $H_2$ = the first and second critical fields of the superconductive material of the insert, respectively;
$H_1$ and $I_2$ = the rated and overload currents of the cable, respectively.

8. A cable as claimed in claim 7, wherein a dielectric is provided separating said local segments of the stabilizing substrates.

9. A cable as claimed in claim 7, wherein a metal or an alloy is provided separating said local segments of the stabilizing substrates.

10. A cable as claimed in claim 9, wherein the outer surface of the separating material of said shield and the inner surface of the separating material of the conductor are covered with a layer of a superconductive material.

* * * * *

UNITED STATES PATENT OFFICE
CERTIFICATE OF CORRECTION

Patent No. 4,184,042          Dated  January 15, 1980

Inventor(s)   Mikhail L. Vulis, et al

It is certified that error appears in the above-identified patent and that said Letters Patent are hereby corrected as shown below:

Column 2, lines 19 and 37:  "$H \div \sqrt{\Delta}$" should read -- $H \div \sqrt{\Delta}$ --.

Column 5, line 48:  Before "referred" delete "(".

Column 6, line 6:  Change the comma to --is accomplished--.

line 57:  "substate" should be --substrate--.

Column 7, line 51, the formula:  "1" should be -- $\ell$ --.

Column 11, line 11:  "corrent" should be --current--.

Column 12, line 41: "$H_1$" should be --$I_1$--.

Signed and Sealed this

Eleventh Day of November 198

[SEAL]

*Attest:*

SIDNEY A. DIAMOND

*Attesting Officer*    *Commissioner of Patents and Trademar*